United States Patent [19]

Marcinko et al.

[11] Patent Number: 5,463,981
[45] Date of Patent: Nov. 7, 1995

[54] STUFFED ANIMAL NURSING MOM

[76] Inventors: Kathleen Marcinko, 91 Newkirk Rd., Yonkers, N.Y. 10710; Maria Piacente-Vitro, 96 Inwood Rd., Middletown, N.Y. 10940; George Spector, 233 Broadway Rm 702, New York, N.Y. 10279

[21] Appl. No.: 303,722

[22] Filed: Sep. 9, 1994

[51] Int. Cl.⁶ ........................................................ A01K 9/00
[52] U.S. Cl. ................................................................. 119/71
[58] Field of Search ...................................... 119/71, 174

[56] References Cited

U.S. PATENT DOCUMENTS

| | | | |
|---|---|---|---|
| 2,859,731 | 11/1958 | Sutton | 119/174 |
| 3,122,130 | 2/1964 | Brown et al. | 119/71 |
| 4,214,554 | 7/1980 | Smith, Jr. | 119/71 |
| 5,188,061 | 2/1993 | Lombardi | 119/71 |

FOREIGN PATENT DOCUMENTS

| | | | |
|---|---|---|---|
| 109121 | 3/1899 | Germany | 119/71 |
| 874535 | 8/1961 | United Kingdom | 119/71 |

Primary Examiner—Todd E. Manahan

[57] ABSTRACT

A simulated animal nursing device is provided, which consists of a stuffed animal in a form and size to duplicate the actual mother, that will lie on its side upon a floor. The stuffed animal has an opening in a rear side, leading into an internal cavity with a plurality of apertures extending between the internal cavity and a bottom surface. A plurality of nursing feeders are positioned in inverted positions within the internal cavity. Suckling portions of the feeders will extend through the apertures, so that newborn offsprings will have a nursing environment.

2 Claims, 1 Drawing Sheet

STUFFED ANIMAL NURSING MOM

BACKGROUND OF THE INVENTION

The instant invention relates generally to pet suckling appliances and more specifically it relates to a simulated animal nursing device, which provides as much as possible an actual nursing environment for newborn offsprings.

There are available various conventional pet suckling appliances which do not provide the novel improvements of the invention herein disclosed.

SUMMARY OF THE INVENTION

A primary object of the present invention is to provide a simulated animal nursing device that will overcome the shortcomings of the prior art devices.

Another object is to provide a simulated animal nursing device in the form and size of an actual mother, so as to duplicate as much as possible a nursing environment for newborn offsprings.

An additional object is to provide a simulated animal nursing device that can be substituted for the actual mother, if the actual mother is not available to feed the newborn offsprings.

A further object is to provide a simulated animal nursing device that is simple and easy to use.

A still further object is to provide a simulated animal nursing device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
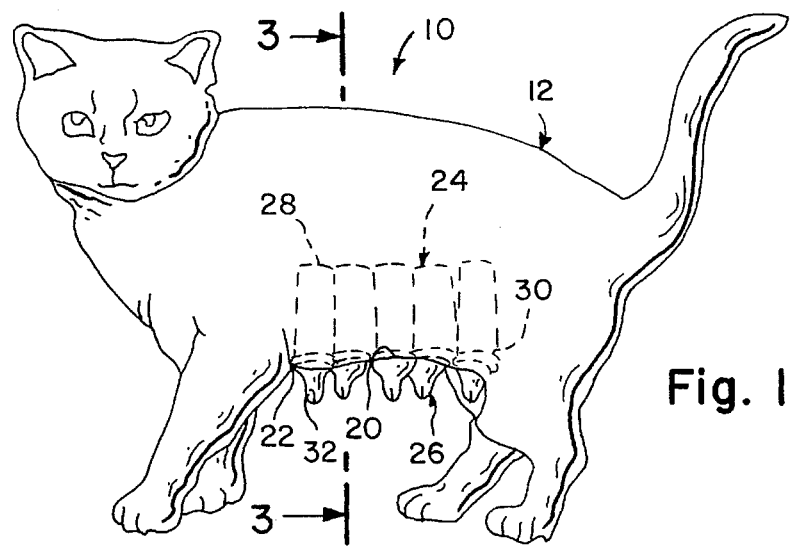
FIG. 1 is a front perspective view of a first embodiment of the instant invention.
Figure 2:
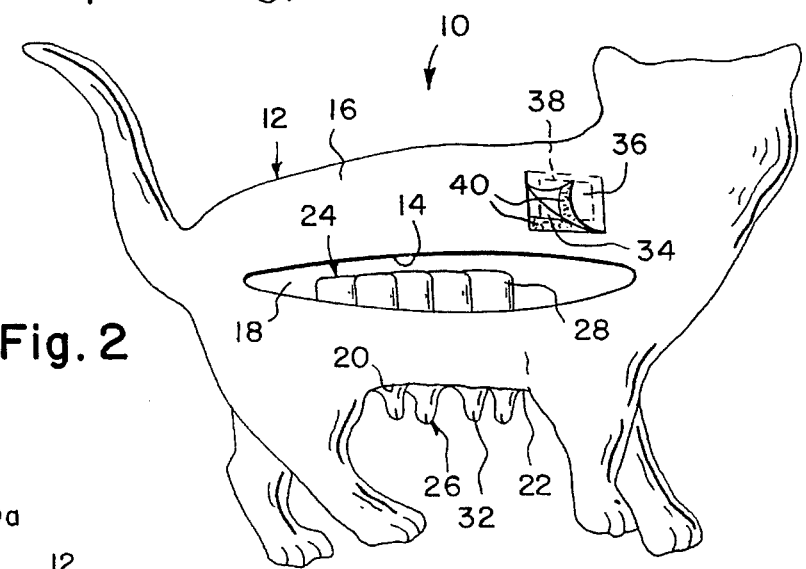
FIG. 2 is a rear perspective view of the first embodiment.
Figure 3:
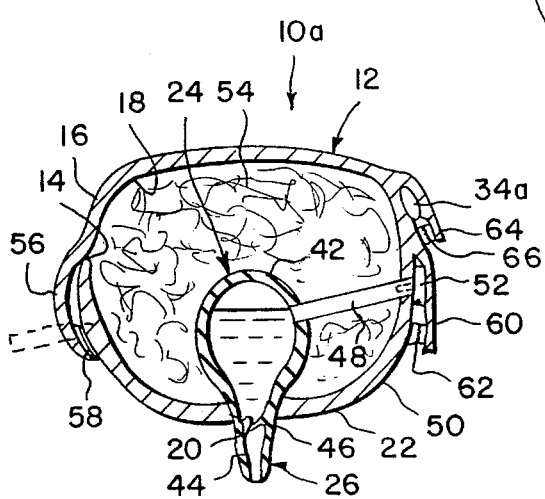
FIG. 3 is a diagrammatic cross sectional view taken along line 3—3 in FIG. 1, showing the various components of a second embodiment of the instant invention.

Turning now descriptively to the drawings, in which similar reference characters denote similar elements throughout the several views, FIGS. 1 through 3 illustrate a simulated animal nursing device 10, which consists of a stuffed animal 12 in a form and size to duplicate the actual mother that will lie on its side upon a floor. The stuffed animal 12 has an opening 14 in a rear side 16 leading into an internal cavity 18, with a plurality of apertures 20 extending between the internal cavity 18 and a bottom surface 22. A plurality of nursing feeders 24 are positioned in inverted positions within the internal cavity 18. Suckling portions 26 of the feeders 24 will extend through the apertures 20, so that newborn offsprings will have a nursing environment.

Each nursing feeder 24, as known in FIGS. 1 and 2, includes a bottle 28 having a neck 30 for holding nursing liquid therein. A nipple 32 is for attachment to the neck 30. The nipple 32 is the suckling portion 26 that extends through one aperture 20 in the stuffed animal 12.

As shown in FIG. 2, a pocket 34 is in the reverse side 16 of the stuffed animal 12, with a flap 36 at the pocket 34. A ticker mechanism 38 is for insertion into the pocket 34, to create the effect of the heartbeat of the actual mother. Mating hook and loop pile fastener strips 40 are about the pocket 34 and the flap 36, so as to seal the pocket 34 in a releasable manner.

A modified simulated animal nursing device 10a is shown in FIG. 4, in which each nursing feeder 24 consists of a collapsible container 42 for holding nursing liquid therein. A nipple 44 is integrally formed on the collapsible container 42. The nipple 44 is the suckling portion 26 that extends through one aperture 20 in the stuffed animal 12. An internal flap valve 46 is within the nipple 44, which will open when the newborn offspring sucks on the nipple 44. A filler tube 48 extends between the collapsible container 42 and a front side 50 of the stuffed animal 12. A filler cap 52 is to plug a free end of the filler tube 48 at the front side 50 of the stuffed animal 12.

Padding 54 is insertable into the internal cavity 18 about the nursing feeders 24. A first flap cover 56 is to conceal the opening 14 in the rear side 16 of the stuffed animal 12. A first set of mating hook and loop pile fastener strips 58 are provided, so as to seal the first flap cover 56 to the rear side 16 of the stuffed animal 12 in a releasable manner.

A second flap cover 60 is to conceal the free end of the filler tube 48 and the filler cap 52 in the front side 50 of the stuffed animal 12. A second set of mating hook and loop pile fastener strips 62 are provided, so as to seal the second flap cover 60 to the front side 50 of the stuffed animal 12 in a releasable manner. A third flap cover 64 is on the front side 50 of the stuffed animal 12. A ticker mechanism 34a fits under the third flap cover 64, to create the effect of the heartbeat of the actual mother. A third set of mating hook and loop pile fastener strips 66 are provided, so as to seal the third flap cover 64 to the front side 50 of the stuffed animal 12 in a releasable manner.

OPERATION OF THE INVENTION

To use the simulated animal nursing device 10, a person simply inserts in inverted positions, the nursing feeders 24 through the opening 14 in the rear side 16 and into the internal cavity 18. The nipples 32 will extend through the apertures 20. The stuffed animal 12 can now be placed on its side upon the floor, so that the newborn offsprings can now nurse.

To use the simulated animal nursing device 10a, a person simply opens the second flap cover 60. The filler cap 52 is then removed from the filler tube 48 and the nursing liquid filled into the collapsible containers 42. The filler cap 52 is then replaced and the second flap cover 60 closed. The stuffed animal 12 can now be placed on its side upon the floor, so that the newborn offsprings can now nurse.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A simulated animal nursing device which comprises:

a) a stuffed animal in a form and size to duplicate the actual mother, that will lie on its side upon a floor, said stuffed animal having an opening in a rear side, leading into an internal cavity with a plurality of apertures extending between the internal cavity and a bottom surface;

b) a plurality of nursing feeders positioned in inverted positions within the internal cavity wherein suckling portions of said feeders will extend through the apertures, so that newborn offsprings will have a nursing environment; wherein each said nursing feeder includes:

c) a collapsible container for holding nursing liquid therein;

d) a nipple integrally formed on said collapsible container, wherein said nipple is said suckling portion that extends through one aperture in said stuffed animal;

e) an internal flap valve within said nipple, which will open when the newborn offspring sucks on said nipple;

f) a filler tube extending between said collapsible container and a front side of said stuffed animal and g) a filler cap to plug a free end of said filler tube at the front side of said stuffed animal.

2. A simulated animal nursing device as recited in claim 1 further including:

a) padding insertable into the internal cavity about said nursing feeders;

b) a first flap cover to conceal the opening in the rear side of said stuffed animal;

c) a first set of mating hook and loop pile fastener strips, so as to seal said first flap cover to the rear side of said stuffed animal in a releasable manner;

d) a second flap cover to conceal the free end of said filler tube and said filler cap in the front side of said stuffed animal;

e) a second set of mating hook and loop pile fastener strips, so as to seal said second flap cover to the front side of said stuffed animal in a releasable manner;

f) a third flap cover on the front side of said stuffed animal;

g) a ticker mechanism to fit under said third flap cover to create the effect of the heartbeat of the actual mother and h) a third set of mating hook and loop pile fastener strips, so as to seal said third flap cover to the front side of said stuffed animal in a releasable manner.

* * * * *